3,480,597
METHOD FOR THE PRODUCTION OF POLYARYLATES

Vasily Vladimirovich Korshak, Ul. Gubkina 4, kv. 81; Svetlana Vasilievna Vinogradova, Jugozapad, kvartal 42–a, korp. 1, kv. 35; and Sergei Nikolaevich Salazkin, Televideniya 14/1, korp. 1, kv. 8, all of Moscow, U.S.S.R.; and Svetlana Veniaminovna Bereza, Ul. Tule 125, kv. 13, Alma-Ata, U.S.S.R.
No Drawing. Filed Mar. 1, 1967, Ser. No. 619,614
Int. Cl. C08g 33/10, 17/00
U.S. Cl. 260—78.5                       1 Claim

ABSTRACT OF THE DISCLOSURE

A method for producing polyarylates by reacting 2-β-hydroxyethyl - 3,3 - bis(4 - hydroxyphenyl) phthalimidine with a dicarboxyl chloride.

---

This invention relates to a method of manufacturing polyarylates, heterochain polyesters, by the polycondensation of diatomic phenols with aromatic dicarboxyl chlorides.

There are methods known of producing thermosetting polyarylates containing free hydroxyl groups; a portion of the bisphenyl in said polyarylates being replaced with an aliphatic polyhydric alcohol.

The presence of an aliphatic component in the polymeric chain of said polyarylates generally results in a substantial deterioration in the heat-resistant characteristics of the polyarylates in question. Another disadvantage of polyarylates of this type is their low molecular weight, such that said polyarylates do not lend themselves to processing into strong films, fibers, and other products.

It is an object of the present invention to provide a method for the manufacture of high-molecular weight, linear polyarylates that contain a controlled number of hydroxyl groups in the polymeric chain.

It is another object of the present invention to provide a method for the manufacture of polyarylates that will enable the modification of the properties of polyarylates by the reaction of free hydroxyl groups therein with appropriate chemical agents.

It is a further object of the present invention to provide a method for the manufacture of polyarylates that will make it possible to effect their structurization with a view to enhancing their thermal stability either by reacting polyarylate hydroxyl groups with appropriate chemical agents, or by subjecting polyarylates to heat treatment.

It is a more specific object of the present invention to provide a method for the manufacture of thermosetting, high-molecular weight, linear polyarylates containing a controllable amount of hydroxyl groups.

According to the present invention, this object is accomplished by the polycondensation of 2-β-hydroxyethyl-3,3-bis(4-hydroxyphenyl) phthalimidine with aromatic dicarboxyl chlorides.

Polyarylates are prepared by interphase polycondensation. The polyarylates thus obtained have a molecular weight of 20,000 to 40,000 and may find application in the preparation of thermosetting heat resistant films, fibers, varnish coatings, and foamed plastics.

Both cured and uncured polyarylate films based on 2-β-hydroxyethyl - 3,3 - bis(4-hydroxyphenyl) phthalimidine are noted for their high tensile strength (above 900 kg./cm.$^2$ at room temperature). The above noted phthalimidines and methods for their production are described in co-pending application Ser. No. 707,404, filed Feb. 28, 1968.

Electronic and radio engineering are the principal fields in which said polymers may find widespread use, e.g., in the preparation of heat resistant plastics, foamed plastics, and insulating films, etc.

The following examples are presented by way of illustration.

Example 1

To an alkaline aqueous solution of 2-β-hydroxyethyl-3,3-bis(4-hydroxyphenyl) phthalimidine containing an emulsifying agent, 1.81 g. of 2-β-hydroxyethyl-3,3-bis (4-hydroxyphenyl) phthalimidine, 0.40 g. of sodium hydroxide, 50 ml. of water, and 0.5 g. of Nekal is added, with vigorous stirring, over a period of 10 min., a solution of 1.015 g. of terephthalyl chloride in 50 ml. of benzene, and the mixture is stirred for another 20 min. The polymer thus obtained is precipitated with methanol, filtered off, and washed first with methanol, then with hot water, and finally again with methanol, followed by drying at 100–110° C. Reduced viscosity of the solution of polymer in tricresol is equal to 1.0–1.2 dl./g.; yield, 80%. The polymer in a capillary tube softens at 350–360° C. The polymer is soluble in dioxane, tetrahydrofuran, dimethylformamide, and other organic solvents. The polymer solution yields strong and transparent cast films.

Example 2

To an alkaline aqueous solution of 2-β-hydroxyethyl-3,3-bis(4-hydroxyphenyl) phthalimidine containing an emulsifying agent 1.81 g. of 2-β-hydroxyethyl-3,3-bis (4-hydroxyphenyl)-phthalimidine, 0.40 g. of sodium hydroxide, 50 ml. of water, and 0.5 g. of Nekal is added with vigorous stirring, over a period of 10 min. a solution of 1.015 of isophthalyl chloride in 50 ml. of benzene, and the reaction mixture is stirred for an additional 20 min. The polymer thus obtained is precipitated with methanol and dried at 100–110° C. Reduced viscosity of the solution of polymer in tricresol is 0.60–0.70 dl./g.; the yield is 75% of the theoretical amount; softening point (in a capillary tube), 270–280° C.

The polymer is soluble in tetrahydrofuran, dioxane, dimethylformamide, and other organic solvents. Films obtained by the casting technique from this polymer solution are strong and transparent.

Example 3

To an alkaline aqueous solution of 2-β-hydroxyethyl-3,3-bis(4-hydroxyphenyl) phthalimidine and phenolphthalein anilide containing an emulsifying agent, 0.90 g. of 2-β-hydroxyethyl-3,3-bis(4-hydroxyphenyl) phthalimidine, 0.98 g. of phenolphthalein anilide, 0.40 g. of sodium hydroxide, 50 ml. of water, and 0.5 g. of Nekal is added, with vigorous stirring, over a period of 10 min. a solution of 1.015 g. terephthalyl chloride in 50 ml. of benzene, and the reaction mixture is stirred for an additional 20 min. The polymer thus obtained is precipitated with methanol, filtered off, washed with methanol, then with hot water, and again with methanol, and thereafter dried at 100–110° C. Reduced viscosity of a polymer solution in tricresol is 0.90 dl./g.; yield, 80%. The softening point of the polymer (in a capillary) is 290–310° C. The polymer is soluble in chloroform, tetrahydrofuran, dioxane, dimethylformamide, and other organic solvents. Films produced by the casting technique from this polymer solution are strong and transparent.

Example 4

To an alkaline aqueous solution of 2-β-hydroxyethyl-3,3-bis(4-hydroxyphenyl) phthalimidine and dian, containing an emulsifying agent 0.90 g. of 2-β-hydroxyethyl-3,3-bis(4-hydroxyphenyl) phthalimidine, 0.57 g. of dian, 0.4 g. of sodium hydroxide, 50 ml. of water, and 0.5 g. of Nekal is added, with vigorous stirring, over a period of 10 min. a solution of 1.015 of terephthalyl chloride in 50 ml. of benzene (or p-xylene), and the reaction mixture is stirred for another 20 min. The polymer thus obtained is precipitated with methanol, filtered off, washed first with methanol, then with hot water, and again with methanol, and dried at 100–110° C. Reduced viscosity of the solution of polymer in tricresol is 0.80–1.1 dl./g.; yield, 80%. The softening point of the polymer (in a capillary) is 270–290° C. The polymer is soluble in chloroform, tetrahydrofuran, dioxane, cyclohexanon, dimethylformamide, and other organic solvents. Cast films prepared from this polymer solution are strong and transparent.

Both uniform and mixed polyarylates based on 2-β-hydroxyethyl - 3,3 - bis(4-hydroxyphenyl) phthalimidine may be cured either by diverse cross-linking agents or by heating at a high temperature (200 to 230° C.). For example, the curing of polyarylates with a diisocyanate is carried out by adding toluenediisocyanate in an amount of 3–10% of the polymer weight of a solution of polyarylate in an organic solvent (chloroform, tetrachloroethane, etc.). Films are prepared from the solution thus obtained. On heating for 1–4 hrs. at a temperature of 60–120° C., the films acquire high strength and are insoluble in organic solvents. In order to accelerate curing, a catalyst, viz, dibutyl dilauril tin, is added to the polymer solution containing toluenediisocyanate. The properties of cross-linked films (mechanical, dielectric, etc.) depend upon the nature of the cross-linking agent used and its amount, as well as upon the content of hydroxyl groups in the polymer.

Although the present invention has been described with reference to the preferred embodiment thereof, it is apparent that various modifications and alterations may be made therein without deviating from the spirit and scope of the present invention, as those skilled in the art will readily understand.

Such modifications and alterations shall be considered as falling within the spirit and scope of the present invention and appended claim.

We claim:
1. A method for the production of polyarylates containing free hydroxyl groups by interphase polycondensation comprising reacting 2-β-hydroxyethyl-3,3-bis(4-hydroxyphenyl) phthalimidine with an aromatic dicarboxyl chloride.

References Cited

UNITED STATES PATENTS

| 3,234,167 | 2/1966 | Sweeny | 260—61 XR |
| 3,272,774 | 9/1966 | Moyer | 260—78 XR |
| 3,398,120 | 8/1968 | Hindersinn et al. | 260—61 XR |

JOSEPH L. SCHOFER, Primary Examiner

J. KNIGHT, Assistant Examiner

U.S. Cl. X.R.

260—2.5, 29.2, 47, 61